(12) United States Patent
Yang

(10) Patent No.: US 7,235,957 B2
(45) Date of Patent: Jun. 26, 2007

(54) POWER SUPPLY WITH CURRENT-SHARING CONTROL AND CURRENT-SHARING METHOD THEREOF

(75) Inventor: Ta-yung Yang, Milpitas, CA (US)

(73) Assignee: System General Corp., Taipei Hsien (TW)

( * ) Notice: Subject to any disclaimer, the term of this patent is extended or adjusted under 35 U.S.C. 154(b) by 0 days.

(21) Appl. No.: 11/148,862

(22) Filed: Jun. 8, 2005

(65) Prior Publication Data
US 2006/0279971 A1  Dec. 14, 2006

(51) Int. Cl.
*G05F 1/573* (2006.01)

(52) U.S. Cl. ............... 323/272; 323/284; 323/286; 363/65

(58) Field of Classification Search ......... 323/272, 323/282, 284, 286, 285; 363/65, 71
See application file for complete search history.

(56) References Cited

U.S. PATENT DOCUMENTS

| | | | |
|---|---|---|---|
| 5,521,809 A | * | 5/1996 | Ashley et al. .......... 363/71 |
| 6,009,000 A | * | 12/1999 | Siri .................. 363/21.09 |
| 6,215,290 B1 | * | 4/2001 | Yang et al. ............ 323/282 |
| 6,404,175 B1 | * | 6/2002 | Yang et al. ............ 323/282 |
| 6,424,129 B1 | * | 7/2002 | Lethellier ............. 323/272 |
| 6,574,124 B2 | * | 6/2003 | Lin et al. ................ 363/65 |
| 6,788,036 B1 | * | 9/2004 | Milavec et al. ........ 323/272 |
| 6,803,750 B2 | * | 10/2004 | Zhang ................... 323/222 |
| 6,894,466 B2 | * | 5/2005 | Huang et al. ........... 323/272 |

* cited by examiner

*Primary Examiner*—Bao Q. Vu
(74) *Attorney, Agent, or Firm*—J.C. Patents

(57) ABSTRACT

The present invention provides a power-supply apparatus with a current-sharing circuit and a current-sharing method thereof. The power supply with a current-sharing function uses a bus terminal as a current-sharing control interface. A power circuit provides an output voltage and an output current to an output terminal; and it generates a current-sense signal according to the output current. A feedback control circuit controls the power circuit according to the output of the power-supply apparatus. A current-sharing unit generates and outputs a bus signal to the bus terminal according to the current-sense signal. The current-sharing unit also generates and outputs a reference signal according to a reference voltage, the bus signal, and the output current so as to regulate the output of the power-supply apparatus through the feedback control circuit. The bus communication circuit monitors and/or controls the power-supply apparatus.

21 Claims, 11 Drawing Sheets

POWER SUPPLY WITH CURRENT-SHARING CONTROL AND CURRENT-SHARING METHOD THEREOF

BACKGROUND OF THE INVENTION

1. Field of the Invention

The present invention relates to a power-supply apparatus, and more particularly, to a power-supply apparatus able to operate in parallel with another power supply to provide a current-sharing mechanism and a current-sharing method thereof.

2. Description of the Related Art

Power supplies have been widely used in electronic apparatuses and other products to provide regulated power. FIG. 1 is a block diagram showing a conventional power supply. Referring to FIG. 1, the power supply includes a direct current (DC) unregulated input voltage $V_{IN}$, a power circuit 10, an regulated DC output voltage $V_O$, and a voltage divider formed by connecting resistors $R_A$ and $R_B$ in series. The power supply further comprises a feedback control circuit, which is coupled to the power circuit 10. The feedback control circuit comprises a control unit 20, an error amplifier 30, and a reference voltage $V_R$. The regulated DC output voltage $V_O$ is coupled to the feedback control circuit via the voltage divider. The voltage divider is coupled from the regulated DC output voltage $V_O$ to a ground reference. A voltage-dividing junction between the resistors $R_A$ and $R_B$ is coupled to a negative terminal of the error amplifier 30. The reference voltage $V_R$ is coupled to a positive terminal of the error amplifier 30. An output terminal of the error amplifier 30 outputs a feedback signal to the control unit 20. The feedback control circuit regulates the feedback signal to control an output of the power supply. Regardless of load conditions or input voltage variations, the feedback signal is regulated so as to maintain a stable DC voltage of the power supply. In addition, the power circuit 10 can be a linear-type or a switching-type structure.

Serial buses, such as I²C or SM(smart buses), have been widely applied in personal computers and peripheral circuits for hardware monitoring. FIG. 2 is a block diagram showing connection of apparatuses through a serial bus in a conventional computer system. Referring to FIG. 2, the apparatuses transmit data through the serial bus, also known as the bus. For instance, the microprocessor is able to monitor a voltage of the battery and an on/off status of the power supply through the bus. Moreover, the microprocessor can access parameters such as the voltage, current, the fan speed, and the operating temperature of the power supply. FIG. 3 shows a timing diagram of the bus in FIG. 2. In the bus, the bus terminal DATA transmits data, and the clock terminal CLK indicates the validity of the data, such as logic levels $V_{DH}$ and $V_{DL}$, from the bus terminal DATA. Accordingly, all apparatuses coupled to the bus can dominate the bus. Under normal situation, levels at the bus terminal DATA and the clock terminal CLK are logic-high. When the bus is transmitting data, levels at the bus terminal DATA and the clock terminal CLK are logic-low.

The conventional power supply cannot provide parallel output. For a system with a high current output and/or a fault tolerance system, parallel power supplies are required. To enhance the reliability, the parallel power supplies must have a current-sharing function to share the output current and to reduce the operating temperature of power supplies.

SUMMARY OF THE INVENTION

Accordingly, the present invention is directed to a power-supply apparatus using an existing bus communication interface as a current-sharing control interface to randomly operate a plurality of power-supply apparatuses in parallel to provide a current-sharing function. The apparatus of the present invention does not need an additional terminal.

The present invention is also directed to a current-sharing method for power supply to operate a plurality of power-supply apparatuses in parallel so that each of the power-supply apparatuses automatically self-regulates its output for the current-sharing function.

The present invention provides a power-supply apparatus with current-sharing control. The power-supply apparatus comprises an input terminal, an output terminal, a bus terminal, a power circuit, a feedback control circuit, a control unit, a current-sharing unit, and a bus communication circuit. The bus terminal is coupled to a bus to provide a bus communication interface and a current-sharing interface. The power circuit receives an input voltage from the input terminal to provide an output voltage and an output current to the output terminal. The power circuit generates a current-sense signal according to the output current. The feedback control circuit is coupled to the output terminal and generates a feedback signal according to an output of the power-supply apparatus and a reference signal. The control unit is coupled to the power circuit and the feedback control circuit. The control unit controls the power circuit to regulate the output of the power-supply apparatus in a stable manner according to the feedback signal. The current-sharing unit is coupled to the bus terminal and the feedback control circuit to output a bus signal according to the current-sense signal and a reference voltage and to output a reference signal to regulate the feedback signal according to the reference voltage, the bus signal, and the current-sense signal. The bus communication circuit is coupled to the bus terminal, the current-sharing unit, and the control unit to monitor the power-supply apparatus according to data transmitted by the bus terminal.

According to the power-supply apparatus of an embodiment of the present invention, the feedback control circuit described above comprises a divider and an amplifier. The divider is coupled to the output terminal to divide the output voltage and to generate a sensing voltage corresponding thereto. A negative terminal of the amplifier is coupled to the divider to receive the sensing voltage. The positive terminal of the amplifier is coupled to the current-sharing unit to receive the reference signal. The output terminal of the amplifier outputs the feedback signal to the control unit.

According to the power-supply apparatus of an embodiment of the present invention, the current-sharing unit described above comprises a pull-up voltage unit, a pull-up resistor, a current generating circuit, an input unit, an output unit, and a regulation unit. The pull-up voltage unit generates a pull-up voltage according to the reference voltage. The pull-up resistor is coupled between the pull-up voltage unit and the bus terminal. The current generating circuit generates a first current signal and a second current signal corresponding to the current-sense signal. The input unit is coupled to the bus terminal for generating a third current signal according to the pull-up voltage and the bus signal. The output unit is coupled to the bus terminal for generating the bus signal according to the second current signal and the pull-up voltage. The regulation unit is coupled to the input unit and the current generating unit for generating and regulating the reference signal according to the reference voltage, the third current signal, and the first current signal.

The present invention provides a power-supply apparatus with current-sharing control. The power-supply apparatus comprises an input terminal, an output terminal, a bus terminal, a power circuit, a feedback control circuit, a control unit, and a current-sharing unit. The bus terminal is coupled to a bus to provide a bus communication interface and a current-sharing control interface. The power circuit receives an input voltage from the input terminal to provide an output voltage and an output current to the output terminal. The feedback control circuit is coupled to the output terminal for generating a feedback signal according to an output of the power-supply apparatus. The control unit is coupled to the power circuit and the feedback control circuit for controlling the power circuit according to the feedback signal. The current-sharing unit is coupled to the power circuit, the bus terminal and the feedback control circuit for outputting a bus signal to the bus terminal according to the output current of the power-supply apparatus and outputting a reference signal to regulate the feedback signal according to a reference voltage, the bus signal, and the output current of the power-supply apparatus.

The present invention provides a current-sharing method for power supplies adapted for a plurality of parallel power-supply apparatuses to automatically regulate their own outputs to supply a total output. Each of the power-supply apparatuses is coupled to a bus to provide a bus communication interface for contacting with an external personal computer or microprocessor. According to the current-sharing method, a bus signal is transmitted among the power-supply apparatus through the bus according to an output status of each of the power-supply apparatuses. An output of each of the power-supply apparatuses is then self-regulated according to the output status of each of the power-supply apparatuses and the bus signal, and the total output is provided by a current-sharing mechanism.

According to the current-sharing method for power supplies of an embodiment of the present invention, the steps of transmitting the bus signal among the power-supply apparatuses through the bus according to the output status of each of the power-supply apparatuses comprise providing a reference voltage; detecting an output current of each of the power-supply apparatuses; and generating the bus signal according to a result of detecting the output current by each of the power-supply apparatuses and the reference voltage.

According to the current-sharing method for power supplies of an embodiment of the present invention, the steps of self-regulating the output of each of the power-supply apparatuses according to the output status of each of the power-supply apparatuses and the bus signal, and providing the total output by a current-sharing mechanism comprise: providing a reference voltage; self-regulating and generating a control signal according to the output status of each of the power-supply apparatuses and the reference voltage; and self-regulating and outputting an output voltage and an output current by each of the power-supply apparatuses corresponding to the control signal, wherein the output voltage and the output current are the output of the power-supply apparatus. Each of the power-supply apparatuses is a power supply.

The present invention comprises a structure with a plurality of parallel power-supply apparatuses. The existing bus communication interface of each power-supply apparatus serves as the current-sharing control interface to share the total output current from the power-supply apparatuses. As a result, the output current of each power-supply apparatus is reduced such that operational temperature of each power-supply apparatus is lowered. Moreover, each power-supply apparatus automatically self-detects its own output status and outputs the bus signal through the bus according to its output status. Accordingly, the current-sharing function can be achieved by automatically regulating the output current of each power-supply apparatus according to the bus signal.

The above and other features of the present invention will be better understood from the following detailed description of the embodiments of the invention that is provided in communication with the accompanying drawings.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings.

DESCRIPTION OF THE EMBODIMENTS

In order to interpret the present invention, the following are descriptions of an embodiment based on a conventional computer structure. Without changing the original circuit structure, the current-sharing function of the parallel power-supply apparatuses, such as power supplies, can be achieved. In the following embodiment, an existing serial bus interface in the computer system serves as a current-sharing control interface without additional interfaces or pins. After reading the embodiments of the present invention, one of ordinary skill in the art can understand the present invention and use the parallel bus interface as the current-sharing control interface.

Figure 1:
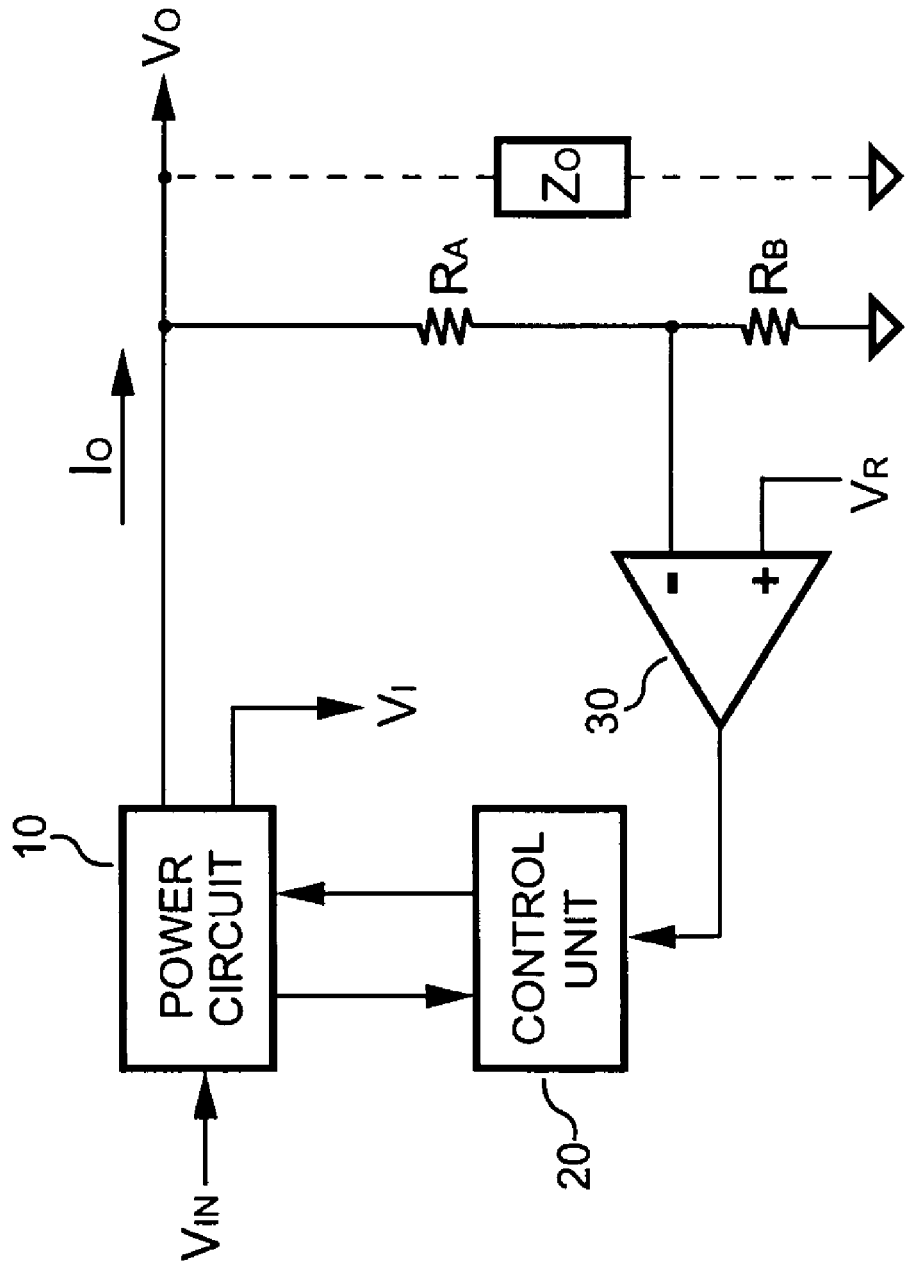
FIG. 1 is a block diagram showing a conventional power supply.
Figure 2:
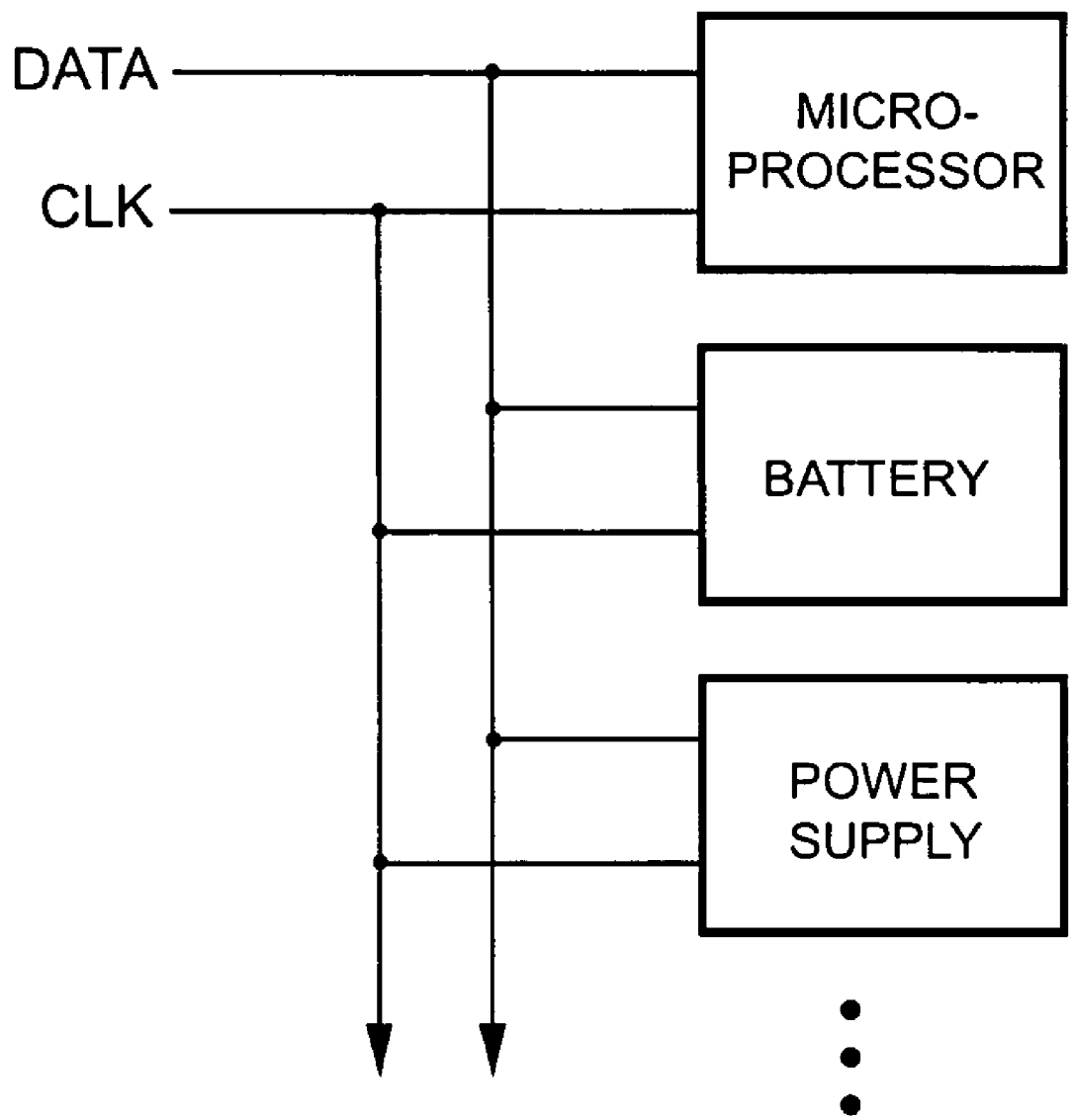
FIG. 2 is a block diagram showing connecting apparatuses through a serial bus in a conventional computer system.
Figure 3:
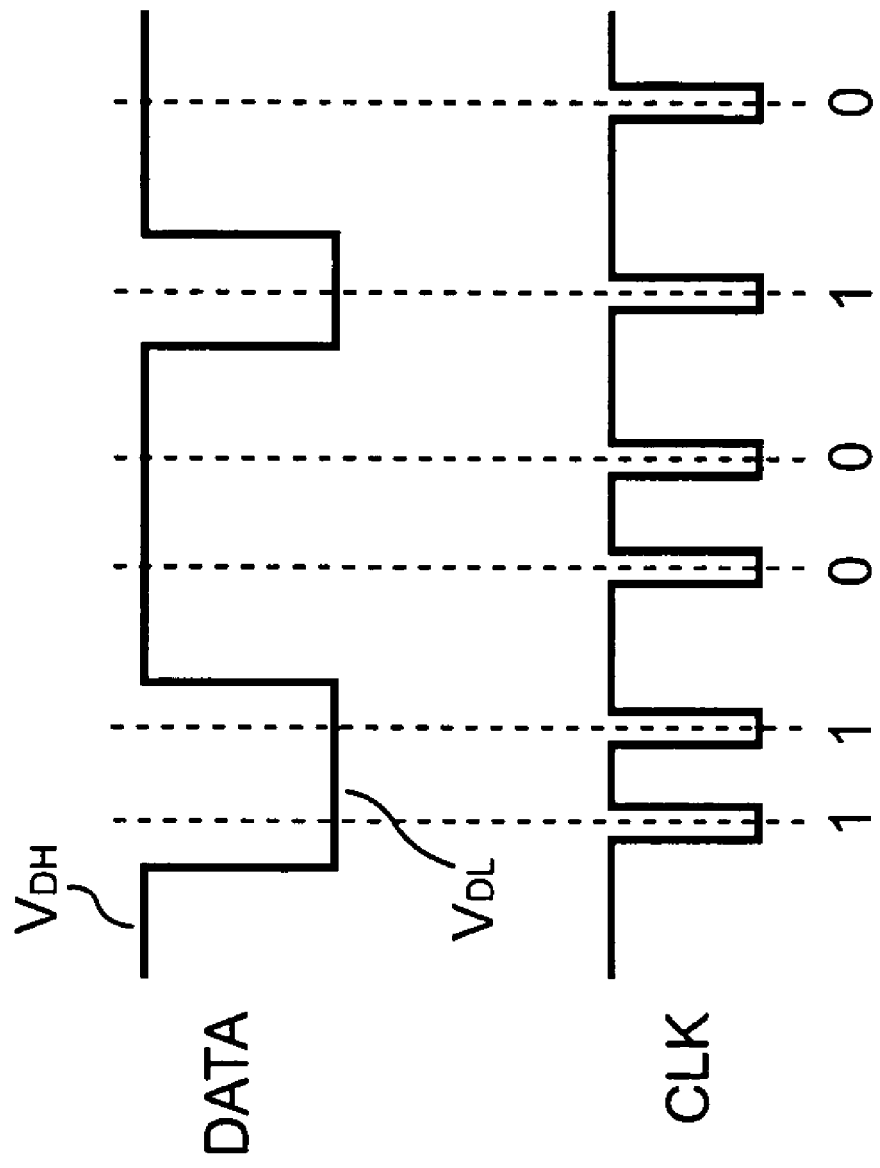
FIG. 3 is a timing drawing of the series bus in FIG. 2.
Figure 4:
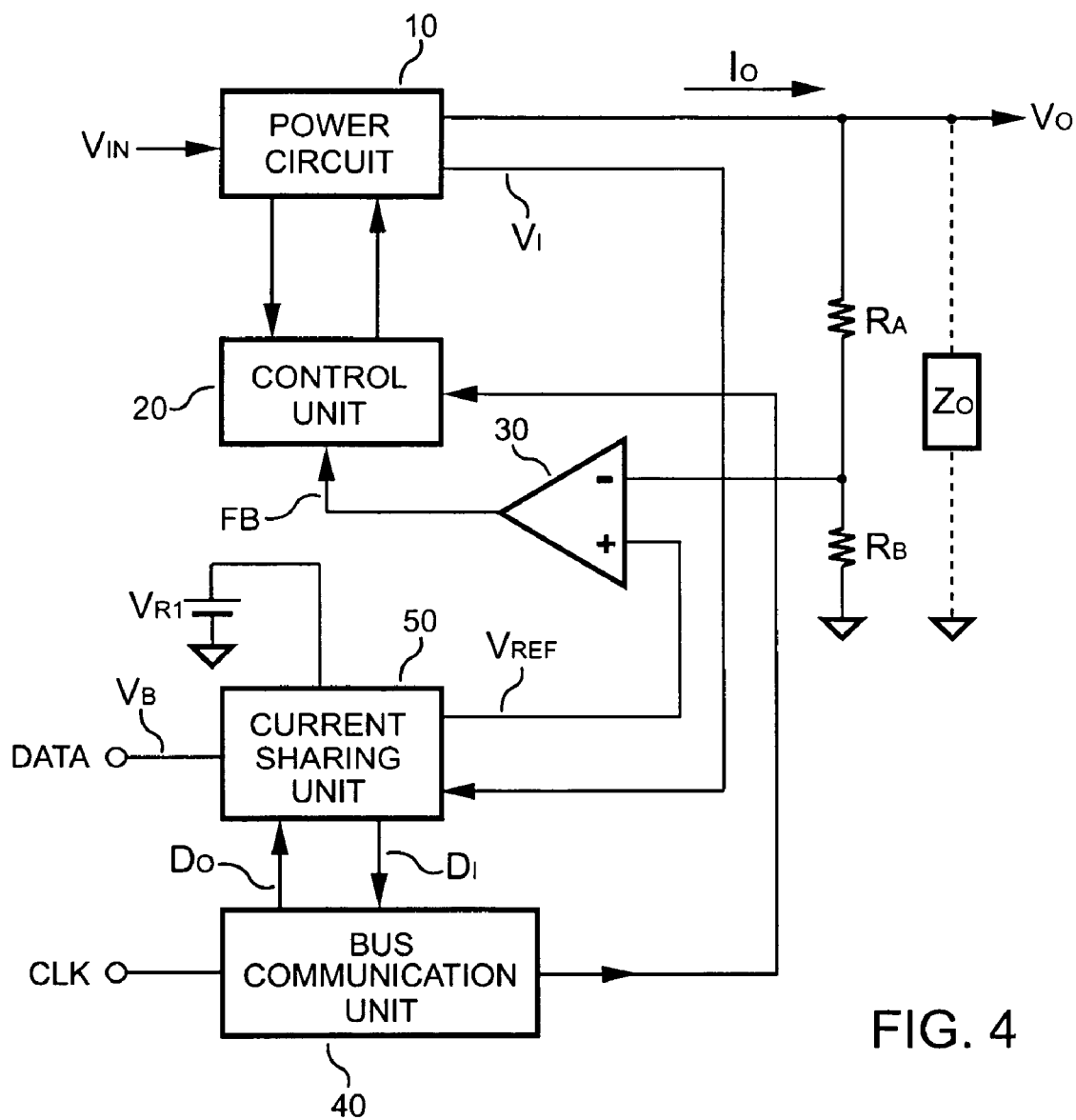
FIG. 4 is a schematic drawing showing a power supply with current sharing function according to an embodiment of the present invention.

FIG. 4 is a schematic drawing showing a power supply with current-sharing function according to an embodiment of the present invention. The power supply comprises an input terminal supplied with an input voltage $V_{IN}$, an output terminal for providing an output voltage $V_O$, and a bus, which is coupled to external personal computers or microprocessors. The bus comprises the bus terminal DATA and the clock terminal CLK, to serve as the bus communication interface and the current-sharing control interface. The power circuit 10 receives the input voltage $V_{IN}$ from the input terminal, and provides the output voltage $V_O$ and an output current $I_O$ to the output terminal. In this embodiment, the power circuit 10 further generates the current-sense signal $V_I$ corresponding to the output current $I_O$.

The feedback control circuit comprises the amplifier 30, such as an error amplifier, and a voltage divider. The voltage divider is composed of resistors $R_A$ and $R_B$, and coupled to the output terminal to divide the output voltage $V_O$ and to generate the corresponding sensing voltage. The amplifier 30 generates a feedback signal FB in response to the sensing-voltage at a negative terminal of the amplifier 30 and a reference signal $V_{REF}$ at a positive terminal of the amplifier 30. The control unit 20 couples to the amplifier 30 and the power circuit 10. According to the feedback signal FB, the control unit 20 controls the power circuit 10 to regulate a stable output of the power supply. The reference signal $V_{REF}$ described above is generated based on a reference voltage $V_{R1}$.

A current-sharing unit 50 is coupled to the bus, such as the bus terminal DATA, and to the feedback control circuit. The current sharing unit 50 generates a bus signal $V_B$ to the bus terminal DATA according to the output current $I_O$ of the output terminal, such as the current-sense signal $V_I$, and the reference voltage $V_{R1}$. The current sharing unit 50 generates the reference signal $V_{REF}$ in response to the reference voltage $V_{R1}$, the bus signal $V_B$ of the bus terminal DATA and the current-sense signal $V_I$ to regulate the feedback signal FB. Accordingly, the current sharing unit 50 regulates the output of the power supply through the feedback control circuit and the power circuit 10.

The bus communication circuit 40 monitors and/or controls the power supply. Via the communication of the bus interface, the bus communication circuit 40 manages data input and output. In this embodiment, the bus communication circuit 40 further couples to the control unit 20 to access and control the data of the power supply, such as voltages, currents, and operating temperatures. When the external personal computer or microprocessor transmits data to the power supply through the bus terminal DATA of the bus, the current sharing unit 50 transmits an input data $D_I$ to the bus communication circuit 40. Accordingly, the bus communication circuit 40 can accesses the input data $D_I$ according to the timing of the clock terminal CLK of the bus. When the power supply is going to transmit the data to the external personal computer or microprocessor through the bus terminal DATA of the bus, the bus communication circuit 40 transmits the output data $D_O$ to the current-sharing control unit 50 according to the timing of the clock terminal CLK.

Figure 5:
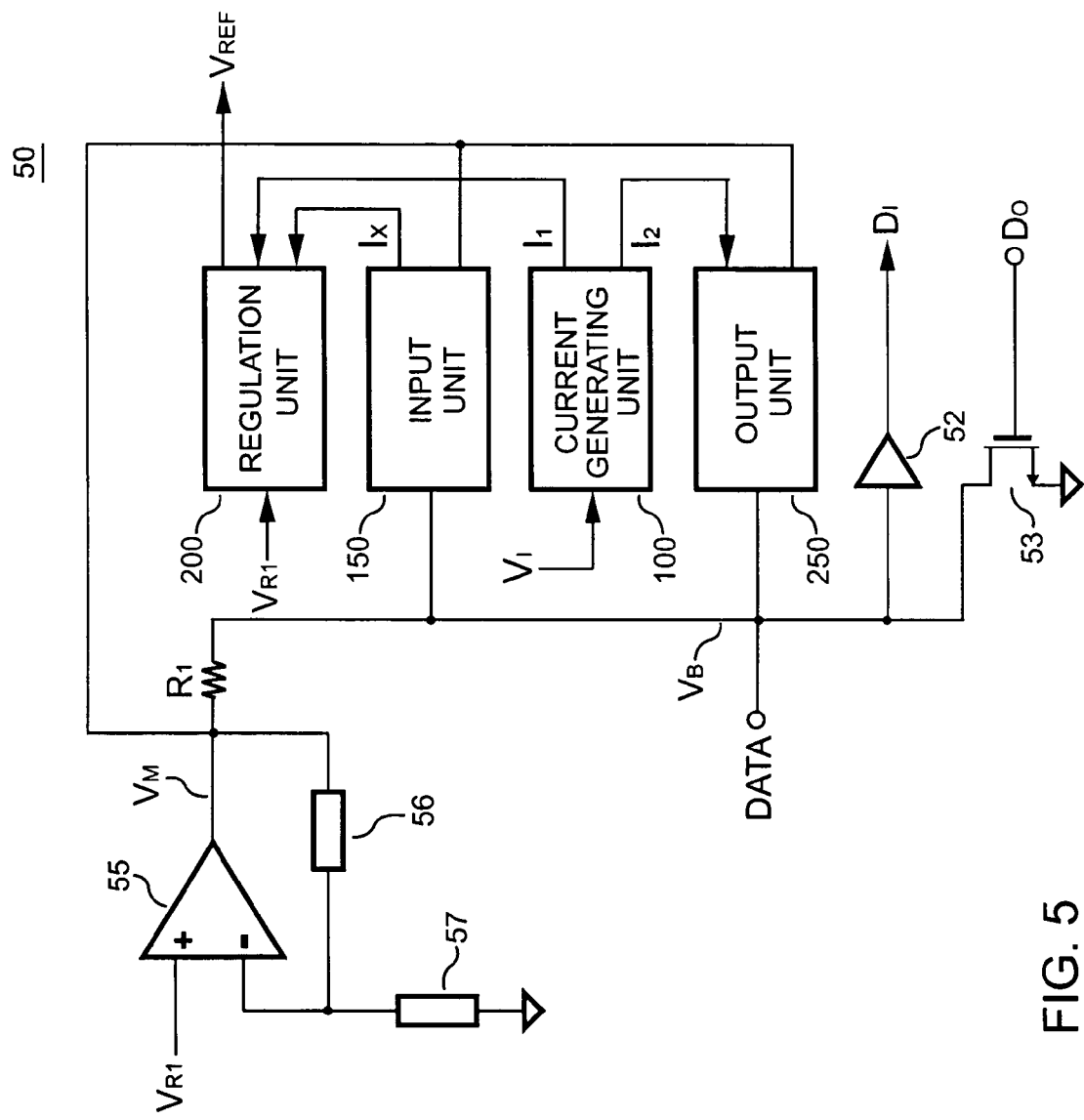
FIG. 5 is a schematic drawing showing a current sharing unit according to an embodiment of the present invention.

FIG. 5 is a schematic drawing showing the current sharing unit 50 according to an embodiment of the present invention. The current sharing unit 50 comprises a pull-up voltage unit, a pull-up resistor $R_1$, a current generating unit 100, an input unit 150, an output unit 250, and a regulation unit 200. The pull-up voltage unit generates a pull-up voltage $V_M$ in response to the reference voltage $V_{R1}$. The pull-up voltage unit comprises an operational amplifier 55, and resistors 56 and 57. The reference voltage $V_{R1}$ is supplied to a positive terminal of the operational amplifier 55. Therefore, the operational amplifier 55 generates the pull-up voltage $V_M$ in response to the reference voltage $V_{R1}$. The pull-up resistor $R_1$, is coupled between the pull-up voltage unit and the bus, such as the bus terminal DATA, to provide a high-impedance pull-up voltage at the bus terminal DATA. The current generating unit 100 generates a first current signal $I_1$ and a second current signal $I_2$ in response to the current-sense signal $V_I$. The input unit 150 is coupled to the bus terminal DATA, and generates a third current signal $I_X$ in response to the bus signal $V_B$ and the pull-up voltage $V_M$. The output unit 250 couples to the bus terminal DATA and generates the bus signal $V_B$ to the bus terminal DATA in response to the pull-up voltage $V_M$ and the second current signal $I_2$. The regulation unit 200 is coupled to the input unit 150 and the current generating unit 100, for generating and regulating the reference signal $V_{REF}$ according to the reference voltage $V_{R1}$, the third current signal $I_X$, and the first current signal $I_1$. When the external personal computer or microprocessor transmits data to the power supply through the bus terminal DATA of the bus, the current sharing unit 50 transmits the input data $D_I$ of the bus terminal DATA to the bus communication circuit 40 through a buffer 52. When the power supply is going to transmit the data to the external personal computer or microprocessor through the bus terminal DATA of the bus, the bus communication circuit 40 transmits the output data $D_O$ to a gate of the transistor 53 according to the timing of the clock terminal CLK. The voltage of the bus terminal DATA is set as the high level by the pull-up resistor $R_1$. Accordingly, when the output data $D_O$ is logic '1', the voltage of the bus terminal DATA can be set as the low level by turning on the transistor 53.

Figure 6:
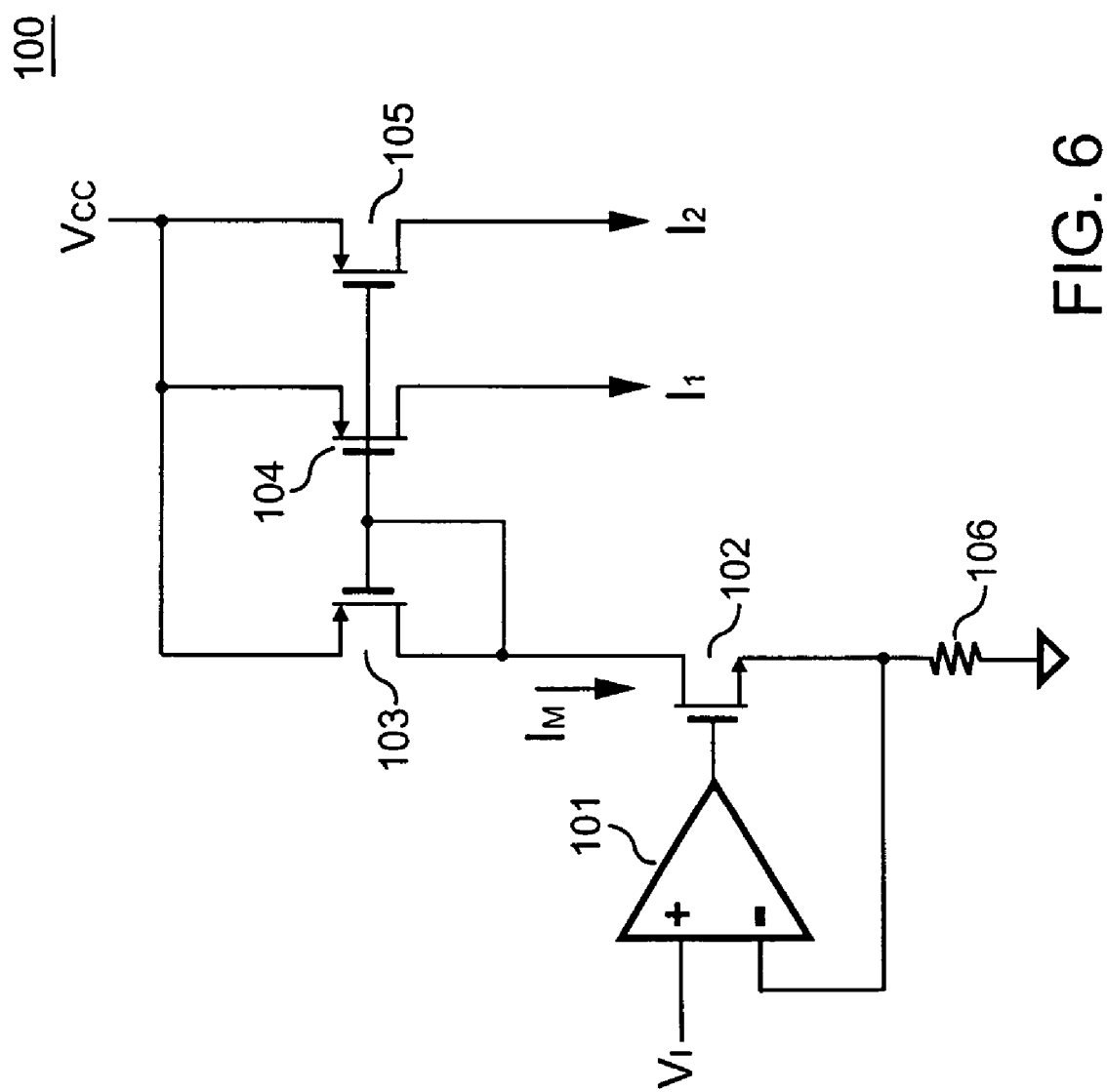
FIG. 6 is a schematic drawing showing a current generating unit according to an embodiment of the present invention.

FIG. 6 is a schematic drawing showing the current generating unit 100 according to an embodiment of the present invention. Referring to FIG. 6, the first current signal $I_1$ and the second current $I_2$ are generated by a mirror current $I_M$ of a first current mirror, which is composed of the transistors 103, 104, and 105. The mirror current $I_M$ is generated by the operational amplifier 101, the transistor 102, and a resistor 106 in response to the current-sense signal $V_I$. Accordingly, the first current signal $I_1$, and the second current signal $I_2$ are generated corresponding to the current-sense signal $V_I$ and the output current $I_O$.

Figure 7:
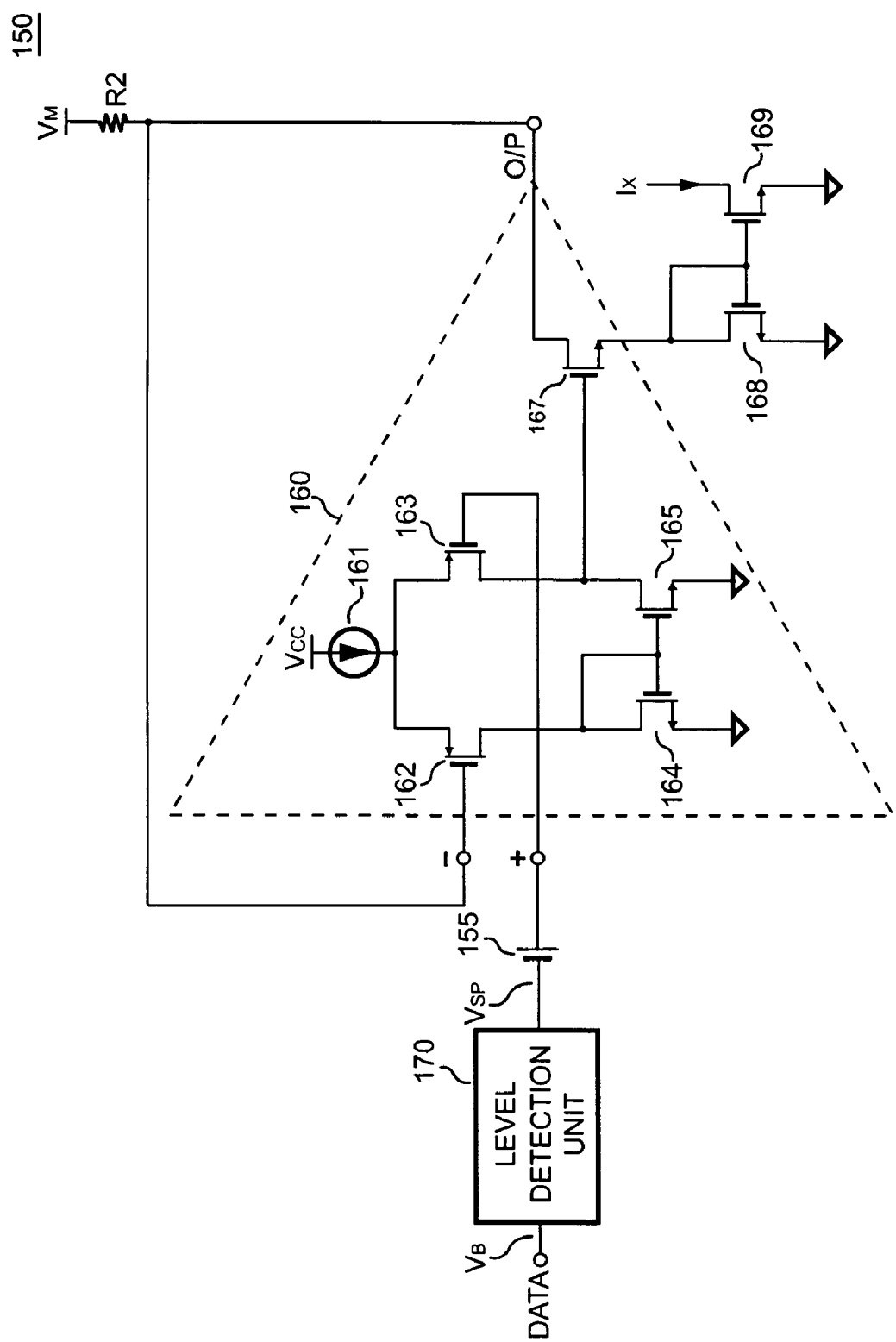
FIG. 7 is a schematic drawing showing an input unit according to an embodiment of the present invention.

FIG. 7 is a schematic drawing showing the input unit 150 according to an embodiment of the present invention. Referring to FIG. 7, the input unit 150 comprises an input resistor $R_2$, a level detection unit 170, and a buffer amplifier 160. The level detection unit 170 is coupled to the bus, such as the bus terminal DATA, to detect the bus signal $V_B$. The buffer amplifier 160 comprises a first output terminal O/P and a second output terminal. A positive terminal of the buffer amplifier 160 receives a bias signal $V_{SP}$ via an offset voltage source 155. A negative terminal of the buffer amplifier 160 is coupled to the first output terminal O/P thereof. The first output terminal O/P is coupled to the pull-up voltage $V_M$ through the input resistor $R_2$. The second output terminal of the buffer amplifier 160 generates the third current signal $I_X$ in response to the pull-up voltage $V_M$, the bias signal $V_{SP}$, the offset voltage source 155, and the input resistor $R_2$.

The current source 161 and the transistors 162–165 form the differential input stage of the buffer amplifier 160. The transistor 167 is coupled between the transistor 165 and the first output terminal O/P of the buffer amplifier 160. The transistor 168 and transistor 169 constitute a second current mirror. Wherein, the transistor 168 is coupled to the transistor 167 to receive a current from the first output terminal O/P of the buffer amplifier 160. The transistor 169 outputs the third current signal $I_X$. Accordingly, the third current signal $I_X$ is proportional to the current of the first output terminal O/P of the buffer amplifier 160. The third current signal $I_X$ can be expressed by, $$I_x = k_1 \times \frac{V_M - (V_{SP} + V_{offset})}{R_2} \qquad (1)$$

where $k_1$, represents a current mirror ratio of the second current mirror, and $V_{offset}$ represents a voltage of the offset voltage source 155.

Figure 8:
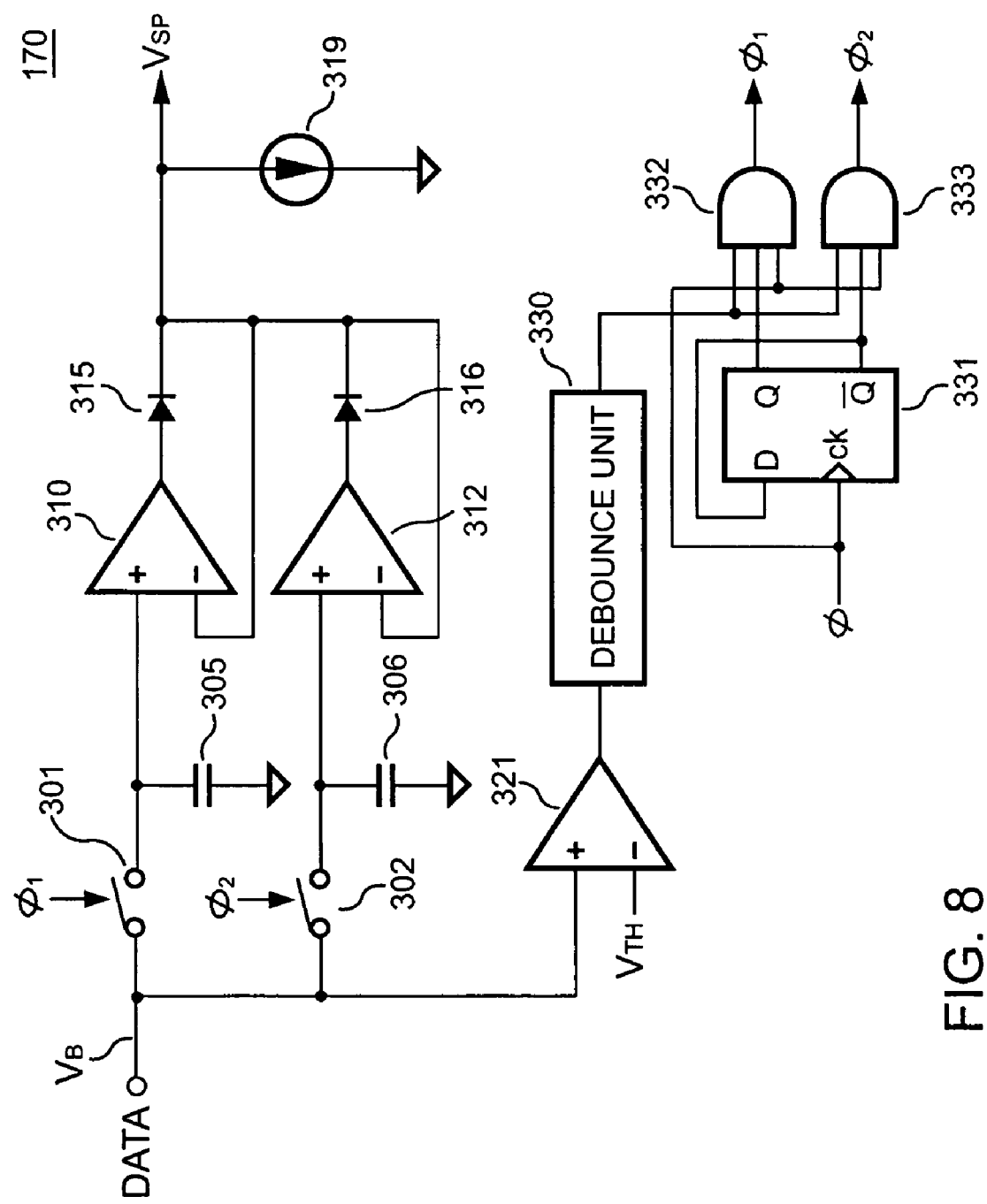
FIG. 8 is a schematic drawing showing a level detection unit of the input unit according to an embodiment of the present invention.

FIG. 8 is a schematic drawing showing the level detection unit 170 in the input unit 150 according to an embodiment of the present invention. Referring to FIG. 8, the level detection unit 170 comprises a multi-sampling unit and a buffer-high amplifier. The multi-sampling unit samples the bus signal $V_B$ of the bus, such as the bus terminal DATA, to generate a plurality of sampled signals. The buffer-high amplifier couples to the multi-sampling unit, and determines the bias signal $V_{SP}$ according to one of the sampled signals having highest voltage. The multi-sampling unit comprises the switches 301 and 302, which are controlled by a first sampling signal $\phi_1$ and a second sampling signal $\phi_2$, respectively. The bus signal $V_B$ is sampled by the switches 301 and 302, and stored in the capacitors 305 and 306, respectively.

A sampling signal generator alternatively generates the first sampling signal $\phi_1$ and the second sampling signal $\phi_2$. The sampling signal generator comprises a flip-flop 331, and the AND gates 332 and 333. A periodically generated waveform signal $\phi$ is coupled to an input of the flip-flop 331 and inputs of the AND gates 332 and 333. An output and an inverse output of the flip-flop 331 respectively couples to the AND gates 332 and 333. The AND gates 332 and 333 output the first sampling signal $\phi_1$ and the second sampling signal $\phi_2$, respectively. A positive terminal of the comparator 321 couples to the bus terminal DATA; a negative terminal thereof is supplied with a threshold voltage $V_{TH}$; and an output terminal thereof generates a stop signal. The output terminal of the comparator 321 further couples to the input terminals of the AND gates 332 and 333 via the debounce unit 330. The debounce unit 330 is used to eliminate noises. When the bus signal $V_B$ is lower than the threshold voltage $V_{TH}$, the stop signal will disable the first sampling signal $\phi_1$ and the second sampling signal $\phi_2$.

The buffer-high amplifier comprises amplifiers 310 and 312. The positive terminals of the amplifiers 310 and 312 are coupled to the capacitors 305 and 306, respectively. An output of the amplifier 310 is coupled to an output terminal of the buffer-high amplifier through a diode 315. An output of the amplifier 312 is also coupled to the output terminal of the buffer-high amplifier through a diode 316. The negative terminals of the amplifiers 310 and 312 are coupled to the output terminal of the buffer-high amplifier. The output terminal of the buffer-high amplifier further has a current source 319, which is used for terminating the output of the bias signal $V_{SP}$. Accordingly, the buffer-high amplifier can output the bias signal $V_{SP}$ in response to one of the sampled signals having highest voltage.

Figure 9:
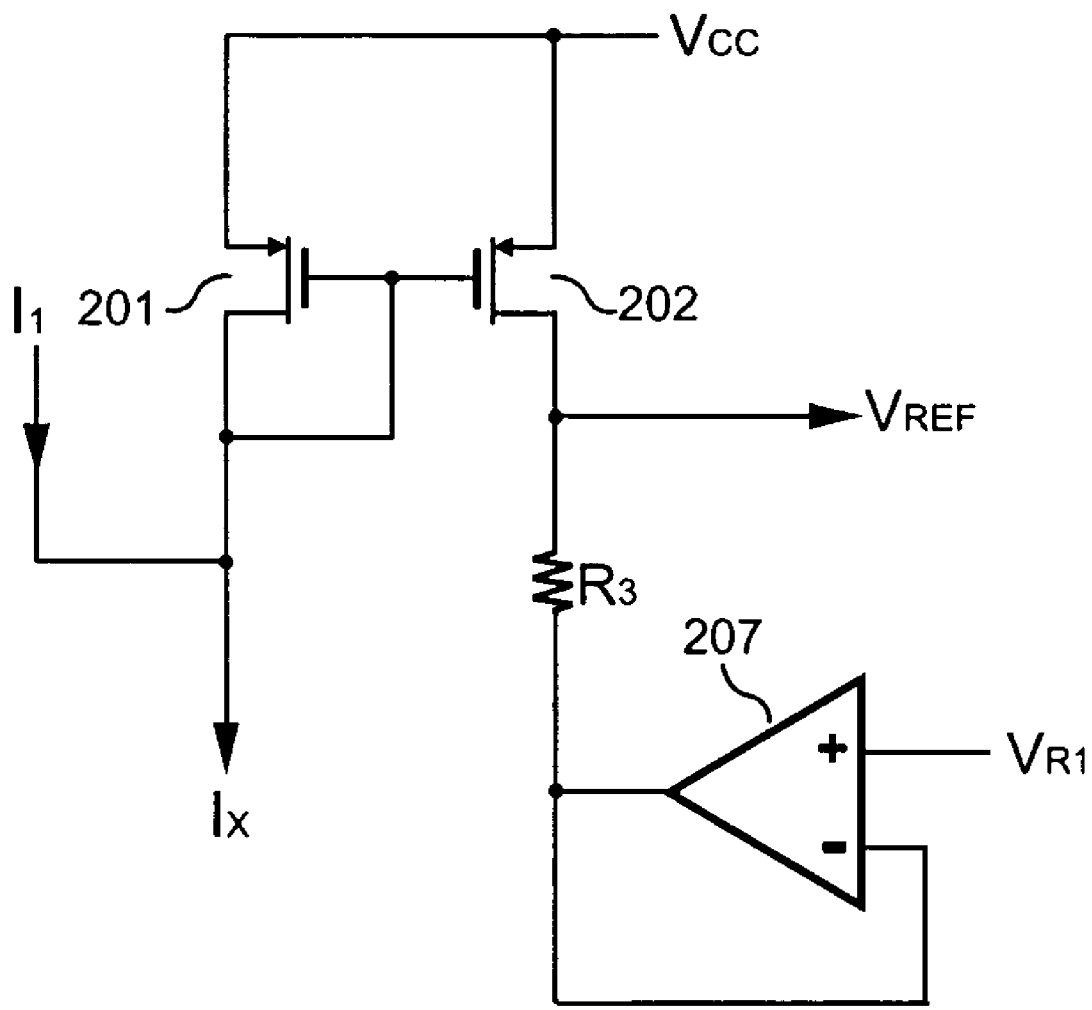
FIG. 9 is a schematic drawing showing a regulation unit according to an embodiment of the present invention.

FIG. 9 is a schematic drawing showing the regulation unit 200 according to an embodiment of the present invention. Referring to FIG. 9, the regulation unit 200 comprises a third current mirror formed by transistors 201 and 202, a regulation resistor $R_3$, and a unit-gain buffer 207. The first current signal $I_1$ and the third current signal $I_X$ are coupled to the transistor 201. The transistor 202 outputs a regulation current signal in response to the first current signal $I_1$ and the third current signal $I_X$. The regulation resistor $R_3$ is coupled to the transistor 202 to receive the regulation current signal and to generate the reference signal $V_{REF}$. An input terminal of the unit-gain buffer 207 receives the reference voltage $V_{R1}$; and an output terminal thereof is coupled to the regulation resistor $R_3$. The reference signal $V_{REF}$ is shown by, $$V_{REF}=V_{R1}+[k_2\times(I_X-I_1)]\times R_3 \qquad (2)$$

Where $k_2$ represents a current mirror ratio of the third current mirror.

Figure 10:
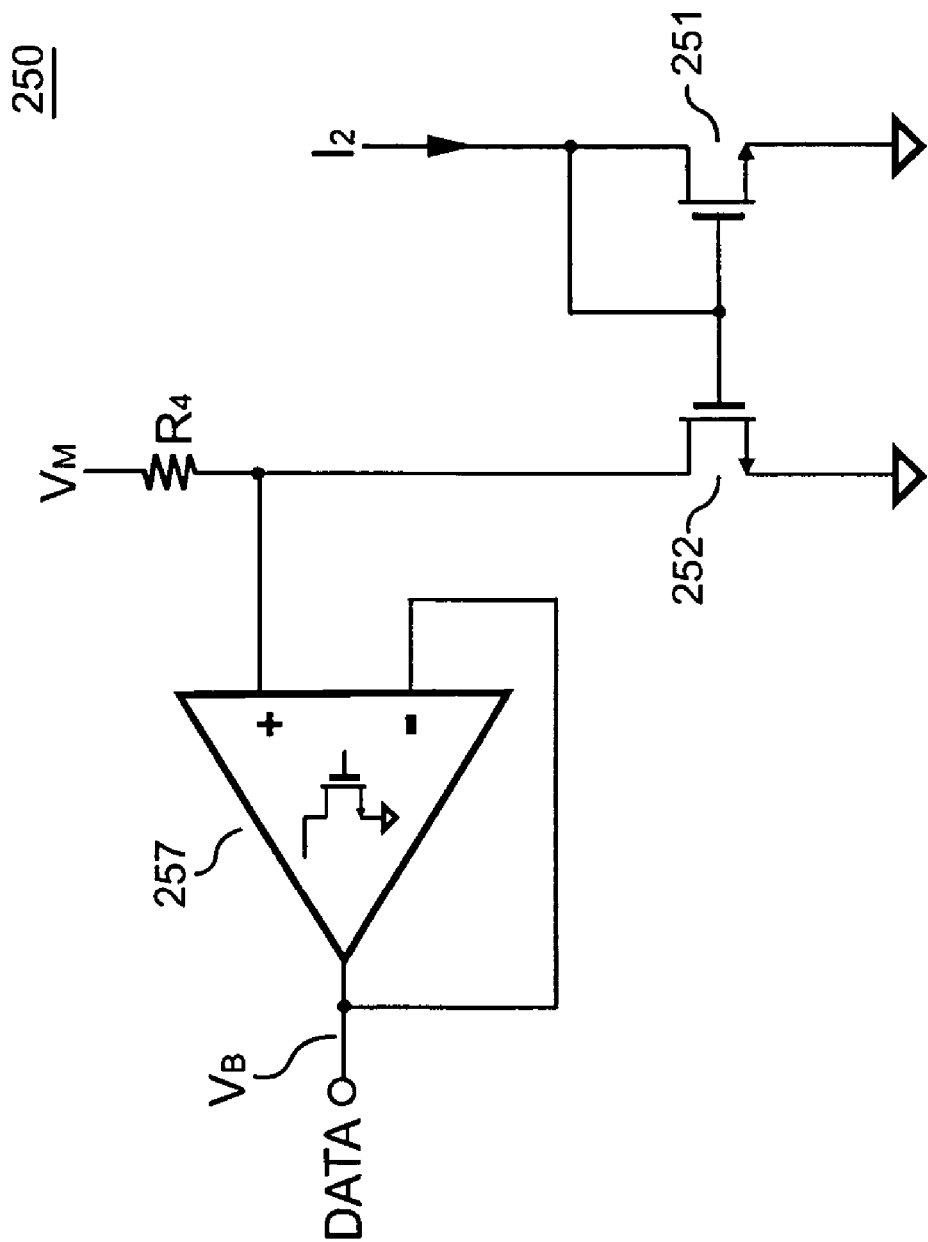
FIG. 10 is a schematic drawing showing an output unit according to an embodiment of the present invention.

FIG. 10 is a schematic drawing showing the output unit 250 according to an embodiment of the present invention. Referring to FIG. 10, the output unit 250 comprises an output resistor $R_4$, a unit-gain amplifier 257, and a fourth current mirror formed by transistors 251 and 252. The output terminal of the unit-gain amplifier 257 is of an open-collector or open-drain type. The output terminal of the unit-gain amplifier 257 is coupled to the bus, such as the bus terminal DATA, to generate the bus signal $V_B$. The bus signal $V_B$ determines the voltage level of the high logic signal at the bus terminal. A negative terminal of the unit-gain amplifier 257 is coupled to an output terminal thereof. A positive terminal of the unit-gain amplifier 257 is coupled to the pull-up voltage $V_M$ via the output resistor $R_4$. The transistor 252 is coupled to the positive terminal of the unit-gain amplifier 257. The fourth current mirror receives the second current signal $I_2$ and generates a voltage drop across the output resistor $R_4$ in response to the second current signal $I_2$. Accordingly, the bus signal $V_B$ is generated according to the second current signal $I_2$, the output resistor $R_4$, and the pull-up voltage $V_M$. The bus signal $V_B$ is shown by, $$V_B=V_M-k_3\times I_2\times R_4 \qquad (3)$$

Where $k_3$ represents a current mirror ratio of the fourth current mirror.

According to the equation (3), the bus signal $V_B$ is regulated based on the output current $I_O$ of the power supply. Since the output terminal of the unit-gain amplifier 257 is of an open-collector or open-drain type, the unit-gain amplifier 257 pulls down the bus signal VB. Thus, the bus terminals can be in parallel. Under no load condition, a maximum voltage of the bus signal $V_B$ is regulated by the pull-up voltage $V_M$.

Figure 11:
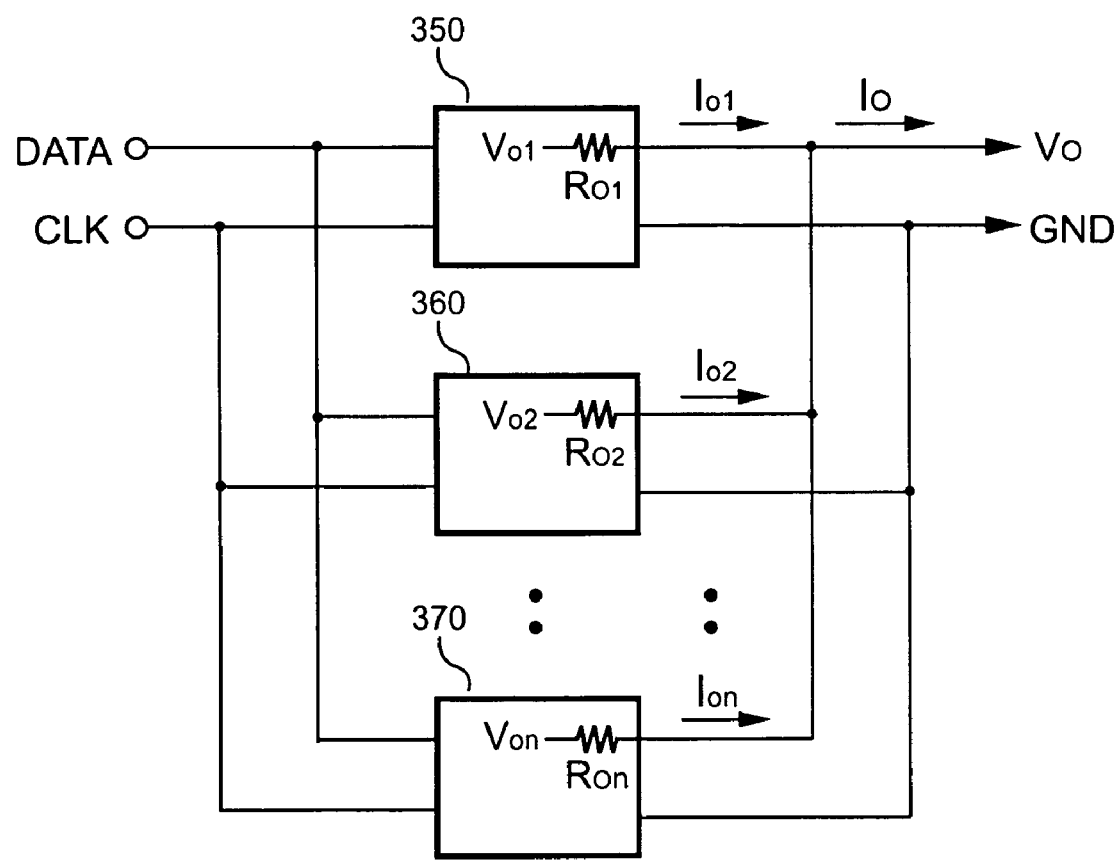
FIG. 11 is a schematic drawing showing parallel power supplies sharing an output current according to an embodiment of the present invention.

FIG. 11 is a schematic drawing showing parallel power supplies sharing an output current $I_O$ according to an embodiment of the present invention. Referring to FIG. 11, the bus signals $V_B$ of the power supplies are coupled through the bus, such as the bus terminal DATA. The power supplies respectively have output voltages $V_{O1}$–$V_{On}$, the output currents $I_{O1}$–$I_{On}$, and output impedances $R_{O1}$–$R_{On}$. The power supply with the highest output current dominates the bus signal $V_B$. The power supply dominating the bus signal $V_B$ is defined as the master power supply, and the other power supplies are auxiliary power supplies. The auxiliary power supplies trace the bus signal $V_B$ for sharing the output current $I_O$. The third current signal $I_X$ is generated according to the equation (1). The offset voltage $V_{offset}$ determines an initial value for the bus signal $V_B$. When the bus signal $V_B$ is larger than the offset voltage $V_{offset}$, the auxiliary power supplies generate the third current signal $I_X$ and share the output current $I_O$ with the master power supply. A lower bus signal $V_B$ will result in a higher third current signal $I_X$. As a result, the auxiliary power supplies achieve the current-sharing function by increasing their output voltages. The output voltage $V_O$ of power supplies, such as $V_{O1}$, $V_{O2}$, ... $V_{On}$, is determined by the reference signal $V_{REF}$. This can be expressed by, $$V_O = \frac{R_A+R_B}{R_B}\times V_{REF} \qquad (4)$$

Where $R_A$ and $R_B$ represent the resistances of the resistors $R_A$ and $R_B$ shown in FIG. 4.

The equation (2) shows that the reference signal $V_{REF}$ is regulated by the third current signal $I_X$ and the first current signal $I_1$. The first current signal $I_1$ represents the output current $I_O$ of the power supply. When the third current signal $I_X$ is higher than the first current signal $I_1$, the reference signal $V_{REF}$ increases. The increment of the reference signal $V_{REF}$ results in the increment of the output current $I_O$. Finally, after the output current $I_O$ is increased, the increment of the reference signal $V_{REF}$ converges. The bus signal $V_B$ is transmitted through the bus. The increment of the output currents of the auxiliary power supplies reduces the output current of the master power supply. As a result, the current-sharing function is achieved. The total output current $I_O$ is shared by all power supplies. It is shown by the following equation, $$I_O = \frac{V_O}{Z_O} = I_{O1} + I_{O2} + \ldots + I_{On} = \frac{V_{O1} - V_O}{R_{O1}} + \frac{V_{O2} - V_O}{R_{O2}} + \ldots + \frac{V_{On} - V_O}{R_{On}} \quad (5)$$

where $Z_O$ represents the total output load.

Although the present invention has been described in terms of exemplary embodiments, it is not limited thereto. Rather, the appended claims should be constructed broadly to include other variants and embodiments of the invention which may be made by those skilled in the field of this art without departing from the scope and range of equivalents of the invention.

What is claimed is:

1. A power-supply apparatus with current-sharing control, comprising:
   an input terminal;
   an output terminal;
   a bus terminal, coupled to a bus to provide a bus communication interface and a current-sharing control interface;
   a power circuit, receiving an input voltage from said input terminal to provide an output voltage and an output current to said output terminal, wherein said power circuit generates a current-sense signal corresponding to said output current;
   a feedback control circuit, coupled to said output terminal, for generating a feedback signal according to an output of said power-supply apparatus and a reference signal;
   a control unit, coupled to said power circuit and said feedback control circuit, for controlling said power circuit according to said feedback signal to regulate said output of said power-supply apparatus;
   a current-sharing unit, coupled to said bus terminal and said feedback control circuit, for outputting a bus signal according to said current-sense signal and a reference voltage, and outputting said reference signal to regulate said feedback signal according to said reference voltage, said bus signal, and said current-sense signal; and
   a bus communication circuit, coupled to said bus, said current-sharing unit and said control unit, for monitoring and/or controlling said power-supply apparatus according to data transmitted by said bus terminal.

2. The power-supply apparatus with current-sharing control of claim 1, wherein said feedback control circuit comprises:
   a divider, coupled to said output terminal to divide said output voltage and to generate a sensing voltage corresponding thereto; and
   an amplifier, wherein a negative terminal thereof is coupled to said divider to receive said sensing voltage, a positive terminal thereof is coupled to said current-sharing unit to receive said reference signal, and an output terminal thereof outputs said feedback signal to said control unit.

3. The power-supply apparatus with current-sharing control of claim 1, wherein said current-sharing unit comprises:
   a pull-up voltage unit, generating a pull-up voltage according to said reference voltage;
   a pull-up resistor, coupled between said pull-up voltage unit and the bus terminal;
   a current generating circuit, generating a first current signal and a second current signal corresponding to said current-sense signal;
   an input unit, coupled to said bus terminal, for generating a third current signal according to said pull-up voltage and said bus signal;
   an output unit, coupled to said bus terminal, for generating said bus signal according to said second current signal and said pull-up voltage; and
   a regulation unit, coupled to said input unit and said current generating unit, for generating and regulating said reference signal according to said reference voltage, said third current signal, and said first current signal.

4. The power-supply apparatus with current-sharing control of claim 3, wherein said input unit comprises:
   an input resistor, a first terminal thereof being supplied with said pull-up voltage;
   a level detection unit, coupled to said bus terminal, for detecting said bus signal from said bus terminal to output a bias signal; and
   a buffer amplifier, a positive terminal thereof connecting to said level detection unit via an offset voltage source to receive said bias signal, a negative terminal thereof being coupled to a first output terminal thereof and a second terminal of said input resistor, a second output terminal thereof generating said third current signal according to said pull-up voltage, said bias signal, said offset voltage source, and said input resistor.

5. The power-supply apparatus with current-sharing control of claim 4, wherein said level detection unit comprises:
   a multi-sampling unit, sampling a high level of said bus signal from said bus terminal to generate a plurality of sampled signals; and
   a buffer-high amplifier, coupled to said multi-sampling unit, for determining said bias signal according to one of the sampled signals with a highest voltage.

6. The power-supply apparatus with current-sharing control of claim 3, wherein said output unit comprises:
   an output resistor, a first terminal thereof being supplied with said pull-up voltage;
   a unit-gain amplifier, a positive terminal thereof being coupled to a second terminal of said output resistor, a negative terminal thereof being coupled to said bus terminal and an output terminal of said unit-gain amplifier to generate said bus signal, wherein said output terminal of the unit-gain amplifier is an open-collector or open-drain type; and
   an output current mirror, coupled to said positive terminal of said unit-gain amplifier, for generating a voltage drop across said output resistor according to said second current signal, wherein said bus signal is generated according to said output resistor, said pull-up voltage, and said second current signal.

7. The power-supply apparatus with current-sharing control of claim 3, wherein said regulation unit comprises:
   a regulation current mirror, for generating an regulation current signal according to said third current signal and said first current signal;
   a regulation resistor, coupled to said regulation current mirror, for receiving said regulation current signal to generate said reference signal; and
   a unit-gain buffer, an input terminal thereof receiving said reference voltage, an output terminal thereof being coupled to said regulation resistor.

8. The power-supply apparatus with current-sharing control of claim 1, wherein said bus is a serial bus.

9. The power-supply apparatus with current-sharing control of claim 1, wherein said power-supply apparatus is a power supply.

10. A power-supply apparatus with current-sharing control, comprising:
    an input terminal;
    an output terminal;
    a bus terminal, coupled to a bus to provide a bus communication interface and a current-sharing control interface;
    a power circuit, receiving an input voltage of said input terminal to provide an output voltage and an output current to said output terminal;
    a feedback control circuit, coupled to said output terminal, for generating a feedback signal according to an output of said power-supply apparatus;
    a control unit, coupled to said power circuit and said feedback control circuit, for controlling said power circuit according to said feedback signal; and
    a current-sharing unit, coupled to the power circuit, the bus terminal and the feedback control circuit, for outputting a bus signal to said bus terminal according to said output current of said power-supply apparatus, and outputting a reference signal to regulate said feedback signal according to a reference voltage, said bus signal, and said output current of the power-supply apparatus.

11. The power-supply apparatus with current-sharing control of claim 10, wherein said feedback control circuit comprises:
    a divider, coupled to said output terminal to divide said output voltage and to generate a sensing voltage corresponding thereto; and
    an amplifier, a negative terminal thereof being coupled to said divider to receive said sensing voltage, a positive terminal thereof being coupled to said current-sharing unit to receive said reference signal, and an output terminal thereof outputs said feedback signal to said control unit.

12. The power-supply apparatus with current-sharing control of claim 10, wherein said current-sharing unit comprises:
    a pull-up voltage unit, generating a pull-up voltage according to said reference voltage;
    a pull-up resistor, coupled between said pull-up voltage unit and said bus terminal;
    an input unit, coupled to said pull-up voltage unit, for generating a third current signal according to said pull-up voltage and said bus signal;
    an output unit, coupled to said bus terminal, for generating said bus signal according to said second current signal and said pull-up voltage; and
    a regulation unit, coupled to said input unit, for generating and regulating said reference signal according to said reference voltage, said third current signal and said output current of said power-supply apparatus.

13. The power-supply apparatus with current-sharing control of claim 12, wherein said input unit comprises:
    an input resistor, a first terminal thereof being coupled to the pull-up voltage;
    a level detection unit, coupled to said bus terminal, for detecting said bus signal from said bus terminal to output a bias signal; and
    a buffer amplifier, a positive terminal thereof connecting to said level detection unit via an offset voltage source to receive said bias signal, a negative terminal thereof being coupled to a first output terminal thereof and a second terminal of said input resistor, a second output terminal thereof generating said third current signal according to said pull-up voltage, said bias signal, said offset voltage source and said input resistor.

14. The power-supply apparatus with current-sharing control of claim 13, wherein said level detection unit comprises:
    a multi-sampling unit, sampling a high level of said bus signal from said bus terminal to generate a plurality of sampled signals; and
    a buffer-high amplifier, coupled to said multi-sampling unit, for determining said bias signal according to one of the sampled signals having a highest voltage.

15. The power-supply apparatus with current-sharing control of claim 12, wherein said output unit comprises:
    an output resistor, a first terminal thereof being supplied with said pull-up voltage;
    a unit-gain amplifier, a positive terminal thereof being coupled to a second terminal of said output resistor, a negative terminal thereof being coupled to said bus terminal and an output terminal of said unit-gain amplifier to generate said bus signal, wherein said output terminal thereof is an open-collector or open-drain type; and
    an output current mirror, coupled to a positive terminal of said unit-gain amplifier, for generating a voltage drop across said output resistor according to said output current of said power-supply apparatus, wherein said bus signal is generated according to said output resistor, said pull-up voltage, and said output current of said power-supply apparatus.

16. The power-supply apparatus with current-sharing control of claim 12, wherein said regulation unit comprises:
    a regulation current mirror, generating a regulation current signal according to said third current signal and said output current of said power-supply apparatus;
    a regulation resistor, coupled to said regulation current mirror, for receiving said regulation current signal to generate said reference signal; and
    a unit-gain buffer, an input terminal thereof receiving said reference voltage, an output terminal thereof being coupled to said adjusting resistor.

17. The power-supply apparatus with current-sharing control of claim 10, wherein said power-supply apparatus is a power supply.

18. A current-sharing method of a power supply, adapted for a plurality of parallel power-supply apparatuses to automatically self-regulate their own outputs to supply a total output, wherein each of said power-supply apparatuses is coupled to a bus to provide a bus communication interface for contacting with an external personal computer or microprocessor, the current-sharing method comprising:

a step of transmitting a bus signal among said power-supply apparatus through said bus according to an output status of each of said power-supply apparatuses; and a step of self-regulating an output of each of said power-supply apparatuses according to said output status of each of said power-supply apparatuses and said bus signal of said bus, and providing said total output by a current-sharing mechanism.

19. The current-sharing method of said power supply of claim 18, wherein said step of transmitting said bus signal among said power-supply apparatus through said bus according to said output status of each of said power-supply apparatus comprises:

providing a reference voltage;

detecting an output current of each of said power-supply apparatuses, and generating said bus signal according to a detecting result of said output current and said reference voltage by each of said power-supply apparatuses.

20. The current-sharing method of said power supply of claim 18, wherein said step of self-regulating said output of each of said power-supply apparatuses according to said output status of each of said power-supply apparatuses and said bus signal of said bus, and providing said total output by a current-sharing mechanism comprises:

providing a reference voltage;

self-regulating and generating a control signal according to said output status of each of said power-supply apparatuses and said reference voltage; and self-regulating and outputting an output voltage and an output current by each of said power-supply apparatuses corresponding to said control signal, wherein said output voltage and said output current are said output of said power-supply apparatus.

21. The current-sharing method for power supply of claim 18, wherein each of said power-supply apparatuses is a power supply.

* * * * *